US012695155B2

(12) United States Patent
Hickey et al.

(10) Patent No.: US 12,695,155 B2
(45) Date of Patent: Jul. 28, 2026

(54) BATTERY CELL VENT EXHAUST MANIFOLD SYSTEM FOR THERMAL RUNAWAY MITIGATION

(71) Applicant: GM GLOBAL TECHNOLOGY OPERATIONS LLC, Detroit, MI (US)

(72) Inventors: Ryan P. Hickey, Austin, TX (US);
Julian R. Sherborne, South Lyon, MI (US); Kenneth M. Eastman, Troy, MI (US); Rodney E. Baker, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 658 days.

(21) Appl. No.: 18/313,433

(22) Filed: May 8, 2023

(65) Prior Publication Data

US 2024/0380065 A1 Nov. 14, 2024

(51) Int. Cl.
| | |
|---|---|
| *H01M 50/342* | (2021.01) |
| *B60L 50/64* | (2019.01) |
| *B60L 58/26* | (2019.01) |
| *H01M 50/209* | (2021.01) |
| *H01M 50/271* | (2021.01) |
| *H01M 50/35* | (2021.01) |
| *H01M 50/367* | (2021.01) |
| *H01M 50/375* | (2021.01) |

(52) U.S. Cl.
CPC ........... *H01M 50/367* (2021.01); *B60L 50/64* (2019.02); *B60L 58/26* (2019.02); *H01M 50/209* (2021.01); *H01M 50/271* (2021.01); *H01M 50/3425* (2021.01); *H01M 50/35* (2021.01); *H01M 50/375* (2021.01); *H01M 2220/20* (2013.01)

(58) Field of Classification Search
CPC ............ H01M 50/3425; H01M 50/35; H01M 50/367; H01M 50/375
See application file for complete search history.

(56) References Cited

U.S. PATENT DOCUMENTS

| | | | | |
|---|---|---|---|---|
| 9,203,068 B2 * | 12/2015 | Utley | .................... | H01M 50/30 |
| 2006/0166081 A1 * | 7/2006 | Sauter | .................. | H01M 50/35 |
| | | | | 429/88 |
| 2021/0408634 A1 * | 12/2021 | Yin | ..................... | H01M 50/209 |

FOREIGN PATENT DOCUMENTS

| | | | | |
|---|---|---|---|---|
| EP | 3940859 A1 * | 1/2022 | ........ | H01M 10/6566 |
| JP | 2011014321 A | 1/2011 | | |

* cited by examiner

*Primary Examiner* — Kevin E Yoon
(74) *Attorney, Agent, or Firm* — Quinn IP Law

(57) ABSTRACT

A battery system includes a plurality of battery cells and a battery system enclosure surrounded by an external environment. The battery system enclosure is configured to house the plurality of battery cells and includes an enclosure tray configured to support the plurality of battery cells and an enclosure cover configured to engage the enclosure tray and seal the battery system enclosure. The battery system also includes an exhaust manifold arranged between the plurality of battery cells and the enclosure cover. The exhaust manifold includes multiple individual gas paths in fluid communication with an exhaust outlet. The gas paths are configured to collect high-temperature gases from each of the plurality of battery cells and guide the high-temperature gases from each of the plurality of battery cells to the exhaust outlet. The exhaust outlet is configured to discharge the high-temperature gases distally from the plurality of battery cells.

17 Claims, 4 Drawing Sheets

BATTERY CELL VENT EXHAUST MANIFOLD SYSTEM FOR THERMAL RUNAWAY MITIGATION

INTRODUCTION

The present disclosure relates to a battery cell vent exhaust manifold system for mitigating a thermal runaway event in a battery cell array.

A battery cell array, such as a battery module, pack, etc., typically includes a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental, and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells in the battery cell array and cause the thermal runaway event to affect the entire array.

SUMMARY

A battery system includes a plurality of battery cells and a battery system enclosure surrounded by an external environment. The battery system enclosure is configured to house the plurality of battery cells and includes an enclosure tray configured to support the plurality of battery cells and an enclosure cover configured to engage the enclosure tray and seal the battery system enclosure. The battery system also includes an exhaust manifold arranged between the plurality of battery cells and the enclosure cover. The exhaust manifold includes multiple individual gas paths in fluid communication with an exhaust outlet. The gas paths are configured to collect high-temperature gases from each of the plurality of battery cells and guide the high-temperature gases from each of the plurality of battery cells to the exhaust outlet. The exhaust outlet is configured to discharge the high-temperature gases distally from the plurality of battery cells.

The plurality of battery cells may be organized into a battery module and include a first row of battery cells and an adjacent second row of battery cells.

The battery system may be a battery cell pack. In such an embodiment, the plurality of battery cells may be organized into individual battery modules. The exhaust manifold may have a modular construction including exhaust manifold sub-assemblies. Each battery cell module may include a respective exhaust manifold sub-assembly configured to interface with another exhaust manifold sub-assembly corresponding to an adjacent battery cell module.

The battery system may additionally include a temperature-sensitive component arranged inside the battery system enclosure between the plurality of battery cells and the enclosure cover. In such an embodiment, the exhaust outlet may be configured to discharge the high-temperature gases distally from the temperature-sensitive component.

The exhaust outlet may be arranged either inside the battery system enclosure or in the external environment.

Each of the plurality of battery cells may be a prismatic cell having a respective cell vent oriented toward the enclosure cover. The exhaust manifold may interface with each prismatic cell at the respective cell vent.

The exhaust manifold may include gas channels defining the individual gas paths. The gas channels may be fluidly sealed to each of the plurality of battery cells at the corresponding cell vents.

The exhaust manifold may be mounted to at least one of the plurality of battery cells.

Specifically, the exhaust manifold may be either bolted to or snapped onto at least one of the plurality of battery cells.

The exhaust manifold may be constructed from a high-temperature fiber-reinforced thermoplastic.

A motor vehicle having a power-source and the above-disclosed battery cell system configured to supply electric energy to the power-source is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
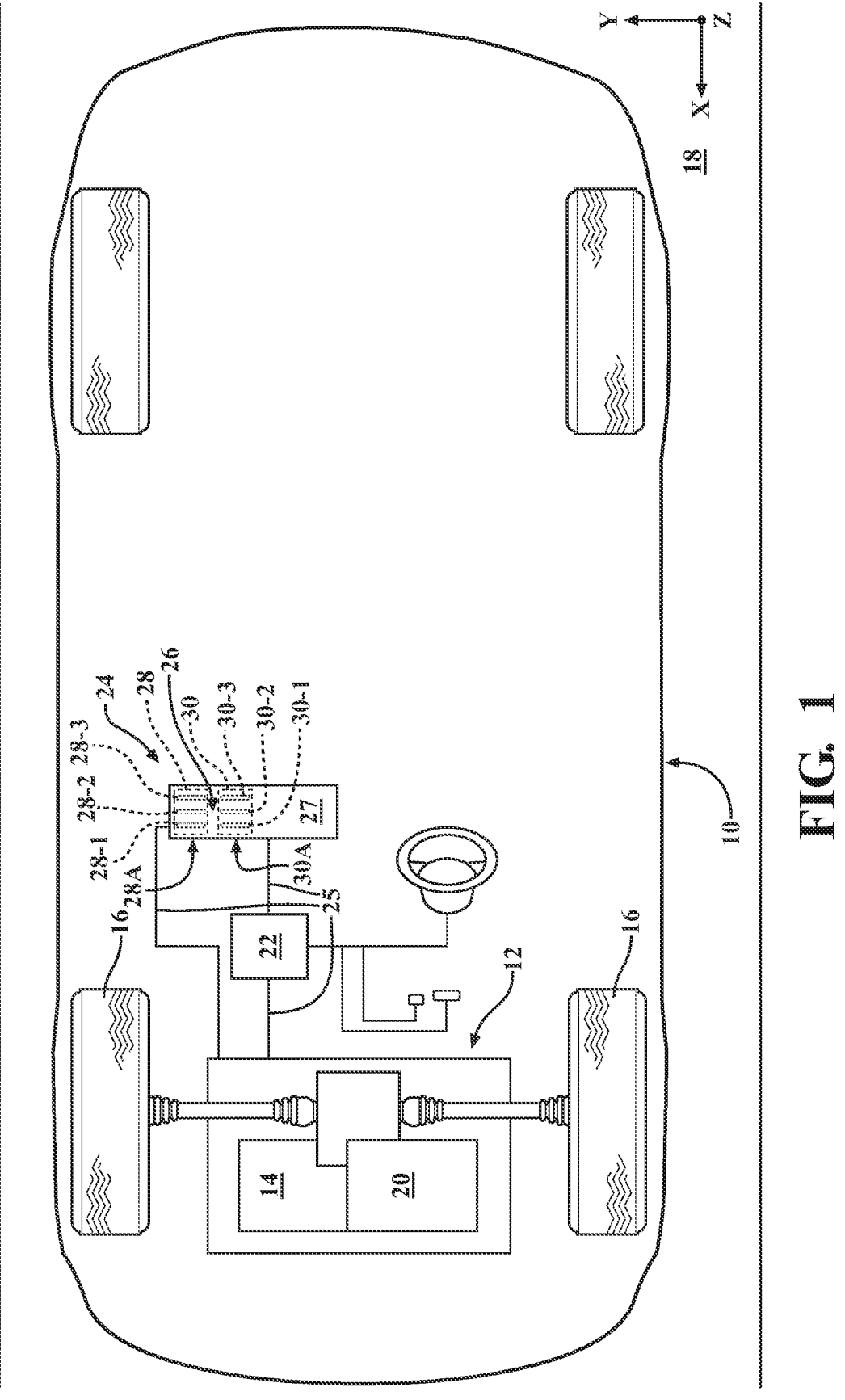
FIG. 1 is a schematic top view of an embodiment of a motor vehicle employing multiple power-sources and a battery system having battery cells arranged in modules configured to generate and store electrical energy.

Referring to FIG. 1, a motor vehicle 10 having a powertrain 12 is depicted. Vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit (CPU) that regulates various functions of the vehicle 10, or as a powertrain control module (PCM) configured to control the powertrain 12 to generate a predetermined amount of power-source torque T. The battery system 24 may be connected to the power-sources 14 and 20, the electronic controller 22, as well as other vehicle systems via a high-voltage BUS 25. Although the battery system 24 is described herein primarily with respect to a vehicle environment, nothing precludes the subject battery system from being employed to power other, non-automotive systems.

With continued reference to FIG. 1, the battery system 24 includes one or more sections or arrays of individual battery cells with respect to an X-Y-Z coordinate system. Each battery cell array may be configured as a battery module 26. Additionally, a number of battery modules 26 may be organized into a battery pack 27. The battery system 24 includes such a plurality of battery cells, for example, a first group of battery cells 28 and a neighboring, directly adjacent, second group of battery cells 30, each extending generally upward, i.e., in the Z direction. Although the battery system 24 is illustrated as a battery pack having six individual modules 26, each having two groups of battery cells 28, 30 organized into individual rows of cells within a particular module, nothing precludes the battery pack from having a smaller or greater number of modules, with each module having a different number of battery cells arranged therein. As shown, the first cell group 28 may include individual battery cells 28-1, 28-2, 28-3 arranged in a first row 28A, while the neighboring second cell group 30 may include individual battery cells 30-1, 30-2, 30-3 arranged in an adjacent second row 30A.

Figure 2:
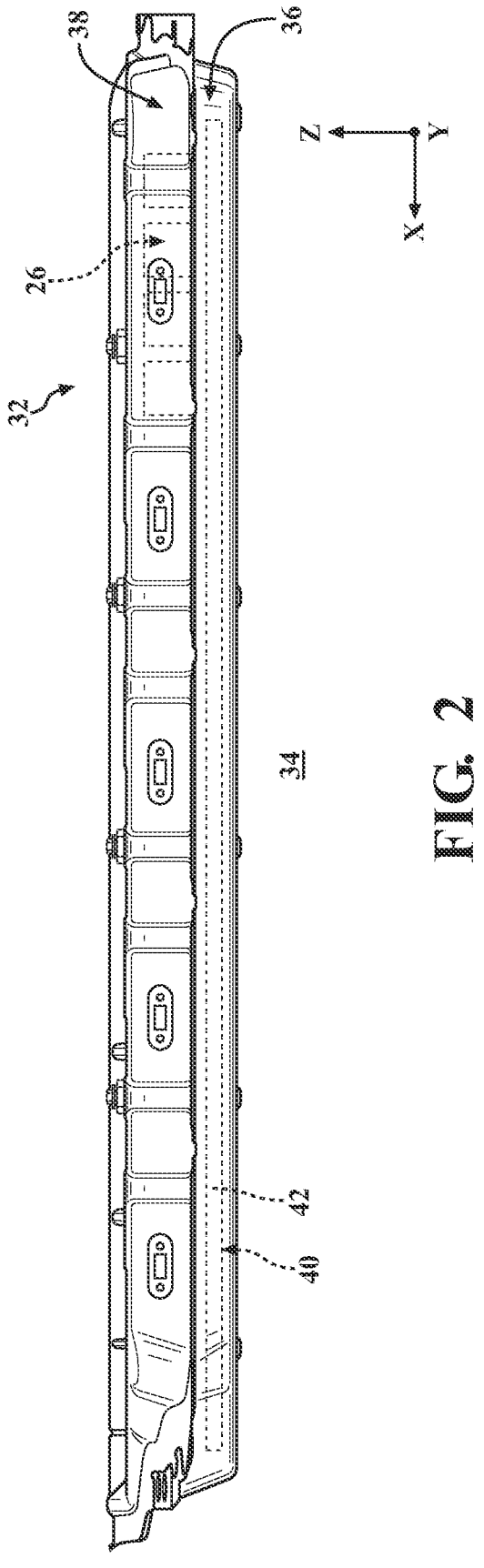
FIG. 2 is a schematic side view of the battery array shown in FIG. 1, illustrating a battery system enclosure having a tray and a cover, according to the present disclosure.

As shown in FIG. 2, the battery system 24 also includes a battery system enclosure 32 configured to house each of the battery modules 26. The battery system enclosure 32 is surrounded by an ambient environment 34, i.e., environment external to the battery system enclosure. The battery system enclosure 32 is configured to manage high-temperature gases emitted by battery cells in each cell group 28, 30, such as during a battery cell thermal runaway event, and expel the high-temperature gases to the external environment 34. The battery system enclosure 32 includes an enclosure tray 36 and an enclosure cover 38. The enclosure cover 38 is generally positioned above the battery cells 28-1, 28-2, 28-3 and 30-1, 30-2, 30-3 and configured to engage the enclosure tray 36 to substantially seal the battery system enclosure 32 and its contents from the external environment 34. As shown, the battery system enclosure 32 is arranged in a horizontal X-Y plane, such that the enclosure cover 38 is positioned above the enclosure tray 36 when viewed along a Z-axis.

Figure 5:
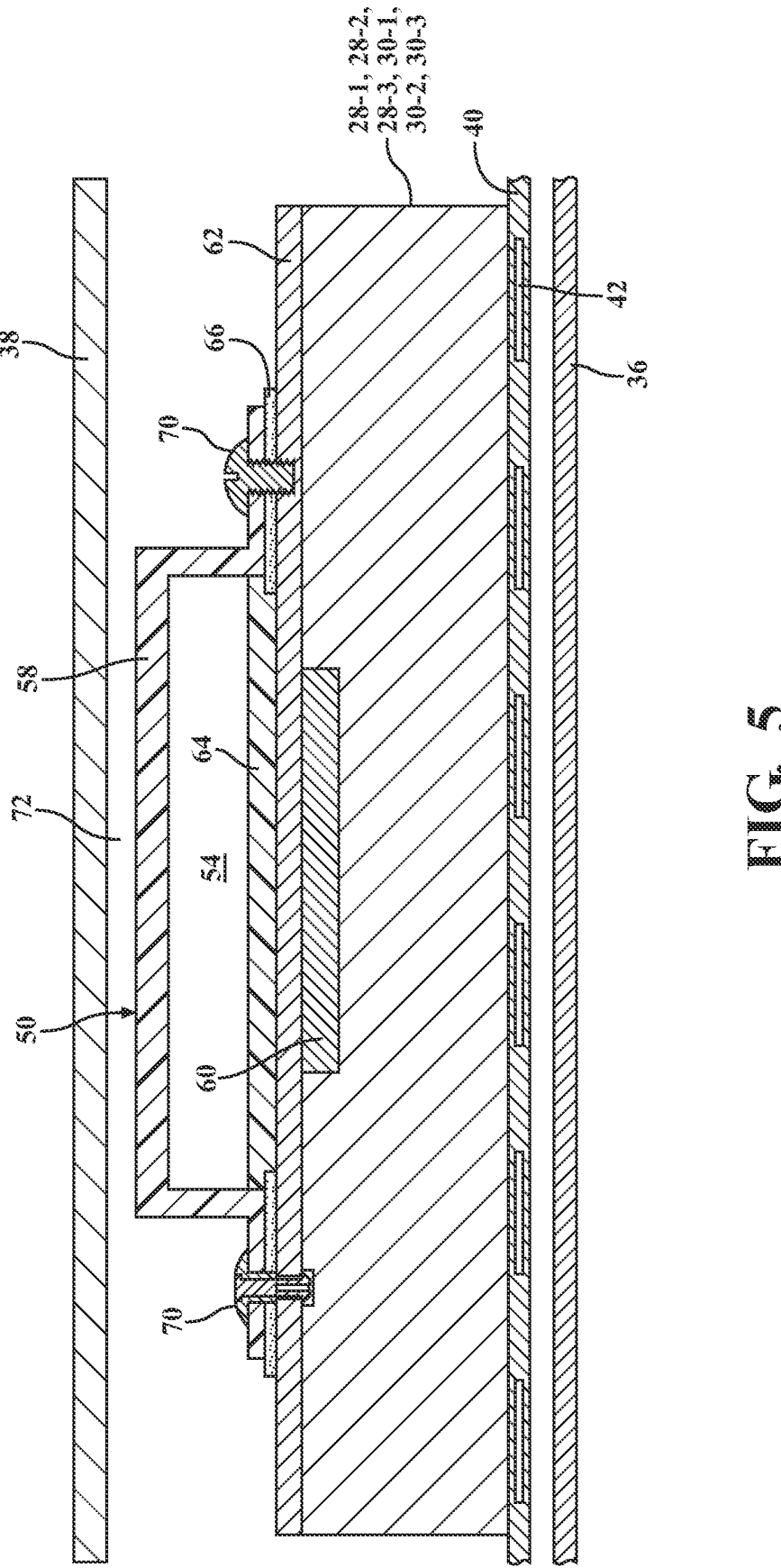
FIG. 5 is a schematic cross-sectional plan view of the battery system shown in FIGS. 2-4, illustrating an arrangement of the exhaust manifold shown in FIGS. 3 and 4 relative to the battery cells and the battery system enclosure.

As shown in FIGS. 2 and 5, the battery system 24 may also include a heat sink 40. The heat sink 40 is generally positioned below and in direct contact with the battery cells of the first and second battery cell groups 28, 30 to thereby absorb thermal energy from the respective battery cells. As shown, the heat sink 40 may be in direct physical contact with the battery cells of the first and second cell groups 28, 30. The heat sink 40 may be configured as a coolant plate having a plurality of coolant channels 42. The coolant channels 40 are specifically configured to circulate a coolant and thereby remove thermal energy from the first and second battery cell groups 28, 30 while the battery system 24 generates/stores electrical energy.

Generally, during normal operation of the battery system 24, the heat sink 40 is effective in absorbing thermal energy released by the first and second battery cell groups 28, 30. However, during extreme conditions, such as during a thermal runaway event (identified via numeral 46 in FIGS. 3 and 4), the amount of thermal energy released by the cell undergoing the event may saturate the heat sink 40 and exceed capacity of the battery system 24 to efficiently transfer heat, e.g., from the battery system enclosure 32 to the ambient environment 34. As a result, excess thermal energy will typically be transferred between the neighboring cells of each of the respective first and second battery cell groups 28, 30 and between the two groups, leading to propagation of the thermal runaway through the battery system 24. The term "thermal runaway event" generally refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

For example, in the event one battery cell in the first battery cell group 28, such as the cell 28-1, experiences the thermal runaway event 46, the excess gases generated during such an event would give rise to highly elevated internal cell pressures having tendency to rupture the casing of the subject cell. In the event of the battery cell 28-1 casing rupture, high-temperature gases 48 (with temperatures up to 1,500 degrees Celsius) emitted by the subject battery cell may send cell debris through the first battery cell group 28, triggering a thermal runaway of other battery cells 28-2, 28-3. Furthermore, the thermal runaway event 46 may spread from the first battery cell group 28 to the second battery cell group 30 and trigger thermal runaway of its battery cells 30-1, 30-2, 30-3. Accordingly, such transfer of high-temperature gases 48 typically increases the likelihood of a chain reaction affecting a significant part of the battery system 24.

Figure 3:
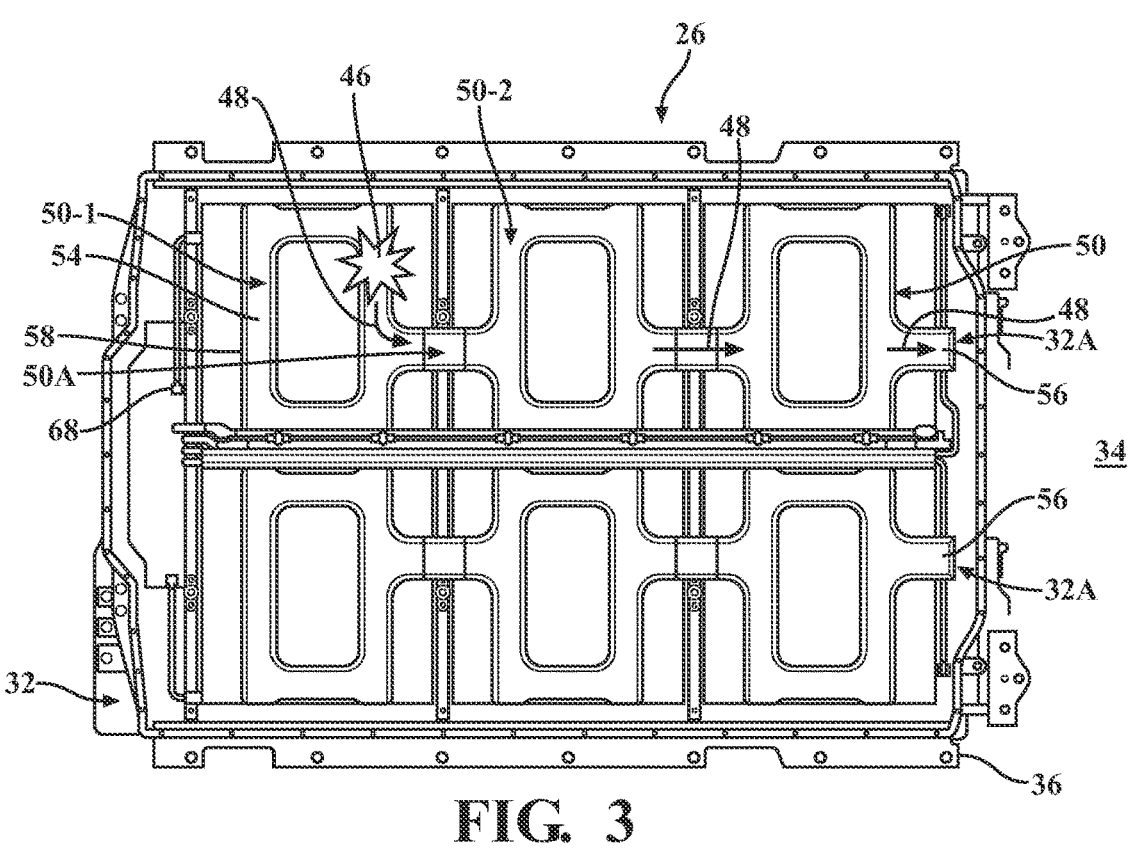
FIG. 3 is a schematic top view of the battery array shown in FIG. 2 with the enclosure cover removed, illustrating an embodiment of an exhaust manifold configured to collect high-temperature gases from the battery cells and guide the gases to an exhaust outlet, according to the disclosure.
Figure 4:
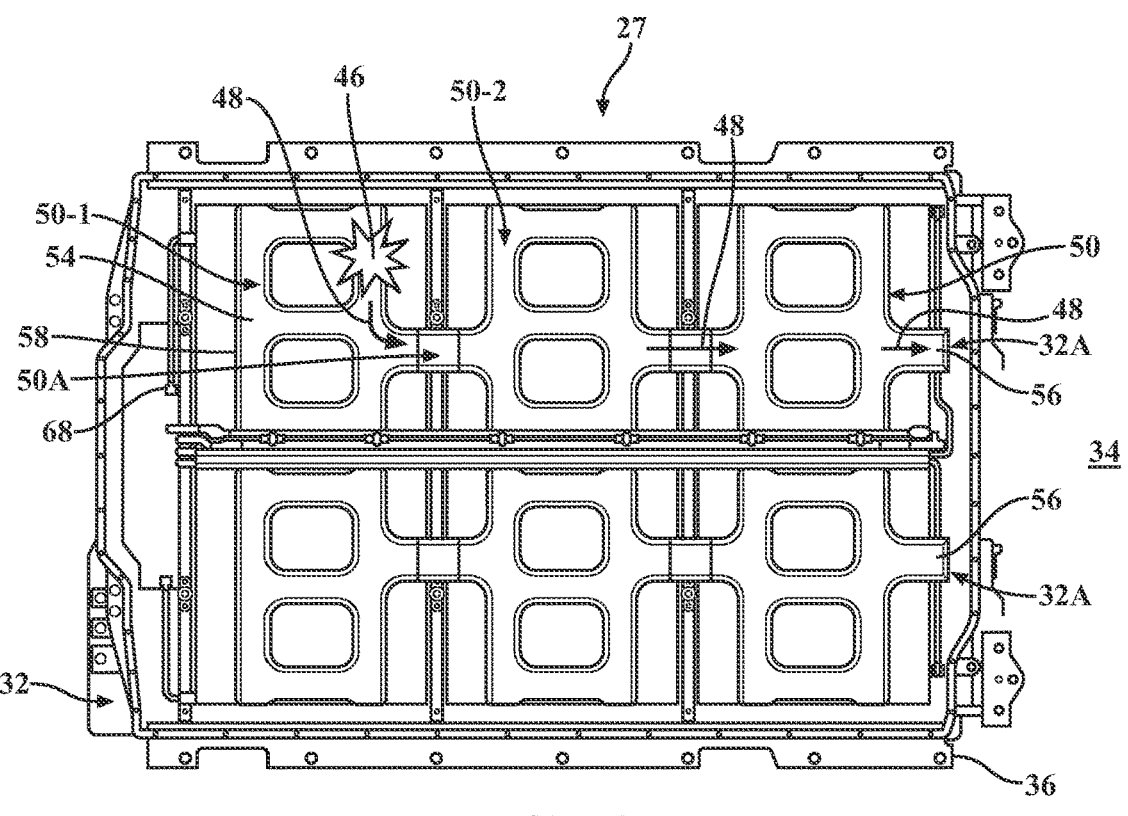
FIG. 4 is a schematic top view of the battery array shown in FIG. 2 with the enclosure cover removed, illustrating another embodiment of the exhaust manifold, according to the disclosure.

As shown in FIGS. 3-5, the battery system 24 also includes an exhaust manifold 50 arranged between the battery cells 28-1, 28-2, 28-3, 30-1, 30-2, 30-3 and the enclosure cover 38. As shown in FIGS. 3 and 4, the exhaust manifold 50 may have a modular construction and be configured as a system of multiple manifold sub-assemblies, such as a first manifold sub-assembly 50-1 and a second manifold sub-assembly 50-2. As shown in FIG. 5, the first exhaust manifold sub-assembly 50-1 is arranged above the battery cells 28-1, 28-2, 28-3—between the battery cells and the enclosure cover 38. The second exhaust manifold sub-assembly 50-2 is arranged between the battery cells 30-1, 30-2, 30-3 and the enclosure cover 38. Each of the exhaust manifold sub-assemblies 50-1, 50-2 has multiple individual gas paths 54 in fluid communication with an exhaust outlet 56 (shown in FIGS. 3 and 4). Accordingly, as shown in FIGS. 3 and 4, each battery cell module 26 and battery pack 27 may include respective exhaust manifold sub-assemblies 50-1, 50-2 configured to interface with at least one other exhaust manifold sub-assembly corresponding to an adjacent battery cell array. The exhaust manifold sub-assemblies 50-1, 50-2 may include a particular arrangement(s) of gas paths 54 configured to route the gases 48 through the module 26 embodiment (shown in FIG. 3) or the pack 27 embodiment (shown in FIG. 4) of the battery cell array.

The exhaust outlet 56 may be arranged either inside the battery system enclosure 32 or in the external environment 34. The exhaust manifold sub-assemblies 50-1, 50-2 are configured to collect high-temperature gases 48 from each of the plurality of battery cells 28-1, 28-2, 28-3, 30-1, 30-2, 30-3 in a particular module 26 and guide or direct the high-temperature gases from each battery cell to the exhaust outlet 56. The exhaust outlet 56 is configured to discharge the high-temperature gases 48 distally from the plurality of battery cells 28-1, 28-2, 28-3, 30-1, 30-2, 30-3 in respective modules 26 either into a space inside the battery system enclosure 32 or out to the external environment 34. Each exhaust manifold exhaust manifold sub-assembly 50-1, 50-2 may include individual gas channels 58 defining the individual gas paths 54. Each of the plurality of battery cells 28 may be a prismatic or a cylindrical cell having a respective cell vent 60 oriented generally upward, toward the enclosure cover 38.

Individual exhaust manifolds 50 may interface with each subject cell(s) at the respective cell vent 60 to route the vented gases 48 into the individual gas channels 58. Individual exhaust manifold sub-assemblies, such as the subassemblies 50-1, 50-2, may be fluidly connected to one another, such as at fused connections(s) 50A to establish continuous fluid path(s) to the exhaust outlet 56 across individual battery modules 26 and through the battery pack 27. The gas channels 58 may be fluidly sealed to each of the plurality of battery cells 28-1, 28-2, 28-3, 30-1, 30-2, 30-3 at the corresponding cell vents 60 via gasketing and/or liner elements shown in FIG. 5. Such gasketing and/or liner elements may include a layer of FRB paper 62, mica layer 64 over-molded in plastic (e.g., high glass-fill nylon) casing, and a high-temperature putty 66. The FRB paper 62 is a thermally resistant layer configured to electrically isolate the battery cells 28-1, 28-2, 28-3, 30-1, 30-2, 30-3 from elements of the enclosure 32 and internal electrical components such as high-voltage BUS bars. As shown, the FRB paper 62 is arranged in contact with the battery cells, between the respective cell vents 60 and the mica layer 64. FRB paper 62 may be attached to the respective battery cells by a suitable adhesive.

The mica layer 64 is configured to line the inside portion of the exhaust manifold 50 to absorb thermal and abrasive loads from the thermal runaway event 46. The mica material in the mica layer 64 is intended to protect its plastic casing from melting. The mica layer 64 may be attached to the exhaust manifold 50 either by a heat stake or by plastic attachment clips (not shown). The high-temperature putty 66 is an intumescent material configured to expand and fill crevices when exposed to extreme temperature during the thermal runaway event 46. Consequently, the high-temperature putty 66 is configured to seal the exhaust manifold 50 to the FRB paper 62 and thereby enhance the exhaust manifold's ability to direct the high-temperature gases 48 in intended locations, such as at fused connections and junctions 50A between the manifold sub-assemblies 50-1, 50-2 and at the exhaust outlet 56.

As shown in FIGS. 3 and 4, the battery system 24 may also include one or more temperature-sensitive components 68. Such temperature-sensitive components 68 may be arranged inside and spaced throughout the battery pack system enclosure 32 between the battery cells 28-1, 28-2, 28-3, 30-1, 30-2, 30-3 and the enclosure cover 38. Examples of relevant temperature-sensitive components 68 may include battery diagnostic and cell monitoring electronics, controllers, coolant lines and connectors for a cold-plate, high-voltage BUS bars, battery terminals, as well as various plastic components. The exhaust manifold 50 may be configured to divert the high-temperature gases 48 away from the temperature-sensitive component(s) 68 and the exhaust outlet 56 may discharge the high-temperature gases distally from the subject component(s). In the system embodiment having the exhaust outlet 56 arranged in the external environment 34, the routed exhaust gases 48 will not affect the temperature-sensitive component(s) 68 inside the battery system enclosure 32. On the other hand, in the embodiment having the exhaust outlet 56 arranged inside the battery system enclosure 32, the exhaust outlet would be positioned distally from the temperature-sensitive component(s) 68 and proximate a vent 32A of the battery pack system enclosure 32.

As shown in FIG. 5, the exhaust manifold 50, i.e., the manifold sub-assemblies 50-1, 50-2, may be mounted to the enclosure cover 38, proximate the plurality of battery cells 28-1, 28-2, 28-3, 30-1, 30-2, 30-3, such as near or above the respective cell vents 60. The exhaust manifold 50 may therefore include a fastening feature 70, such as clip or snap-in means, bolts, screws, etc. for attachment of the manifold to the battery cells 28-1, 28-2, 28-3, 30-1, 30-2, 30-3 (shown in FIG. 5) or to the enclosure cover 38 (not shown). As shown in FIG. 5, the exhaust manifold 50 may be either fastened to, such as bolted to or snapped onto, at least one of the battery cells 28-1, 28-2, 28-3, 30-1, 30-2, 30-3 with the corresponding fastening feature 70 interfacing with and/or extending into or through the FRB paper 62 and the high-temperature putty 66. The exhaust manifold 50 may be constructed from a high-temperature resistant material, such as a metal or a fiber-reinforced thermoplastic (e.g., glass-filled nylon). The exhaust manifold 50 may be arranged such that an airgap 72 (shown in FIG. 5) remains between the gas channels 58 and the enclosure cover 38 for thermal insulation therebetween, thus negating the need for an additional thermal insulation layer.

In summary, the exhaust manifold 50 with individual gas channels is arranged to collect high-temperature gases released during a thermal runaway event by battery cell(s) in respective battery group(s). The exhaust manifold 50 is further arranged to guide such gases to an exhaust outlet, which is positioned to expel the gases out of the battery system enclosure to the ambient. Individual exhaust manifold sub-assemblies may be arranged to collect gases emitted by battery cells in corresponding battery modules and connected to establish a continuous gas flow path out to the exhaust outlet. The battery system may also include various high-temperature resistant gasketing elements to fluidly seal the exhaust manifold 50 to the battery system enclosure and minimize potential for gas leakage inside the enclosure where the gases may affect other battery cells.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery system comprising:
   a plurality of battery cells organized into individual battery modules;
   a battery system enclosure surrounded by an external environment, configured to house the plurality of battery cells, and including an enclosure tray configured to support the plurality of battery cells and an enclosure cover configured to engage the enclosure tray and seal the battery system enclosure; and
   an exhaust manifold arranged between the plurality of battery cells and the enclosure cover and having multiple individual gas paths in fluid communication with an exhaust outlet and configured to collect high-temperature gases from each of the plurality of battery cells and guide the high-temperature gases from each of the plurality of battery cells to the exhaust outlet;
   wherein:
      the exhaust outlet is configured to discharge the high-temperature gases distally from the plurality of battery cells;
      the exhaust manifold has a modular construction including exhaust manifold sub-assemblies;
      each battery cell module includes a respective exhaust manifold sub-assembly configured to interface directly with another exhaust manifold sub-assembly corresponding to an adjacent battery cell module the exhaust manifold is mounted to at least one of the plurality of battery cells, and the exhaust manifold is one of directly bolted to and snapped onto the at least one of the plurality of battery cells.

2. The battery system of claim 1, wherein the plurality of battery cells is organized into a battery module and include a first row of battery cells and an adjacent second row of battery cells.

3. The battery system of claim 1, wherein the battery system is a battery cell pack.

4. The battery system of claim 1, further comprising a temperature-sensitive component arranged inside the battery system enclosure between the plurality of battery cells and the enclosure cover, wherein the exhaust outlet is configured to discharge the high-temperature gases distally from the temperature-sensitive component.

5. The battery system of claim 1, wherein the exhaust outlet is arranged either inside the battery system enclosure or in the external environment.

6. The battery system of claim 1, wherein each of the plurality of battery cells is a prismatic cell having a respective cell vent oriented toward the enclosure cover, and wherein the exhaust manifold interfaces with each prismatic cell at the respective cell vent.

7. The battery system of claim 6, wherein the exhaust manifold includes gas channels defining the individual gas paths, and wherein the gas channels are fluidly sealed to each of the plurality of battery cells at the corresponding cell vents.

8. The battery system of claim 1, wherein the exhaust manifold is constructed from a high-temperature fiber-reinforced thermoplastic.

9. A motor vehicle comprising:
   a power-source configured to generate power-source torque; and
   a battery system configured to supply electrical energy to the power-source, the battery system including:
   a plurality of battery cells organized into individual battery modules;
   a battery system enclosure surrounded by an external environment, configured to house the plurality of battery cells, and including an enclosure tray configured to support the plurality of battery cells and an enclosure cover configured to engage the enclosure tray and seal the battery system enclosure; and
   an exhaust manifold arranged between the plurality of battery cells and the enclosure cover and having multiple individual gas paths in fluid communication with an exhaust outlet and configured to collect high-temperature gases from each of the plurality of battery cells and guide the high-temperature gases from each of the plurality of battery cells to the exhaust outlet;
   wherein:
      the exhaust outlet is configured to discharge the high-temperature gases distally from the plurality of battery cells;
      the exhaust manifold has a modular construction including exhaust manifold sub-assemblies;
      each battery cell module includes a respective exhaust manifold sub-assembly configured to interface directly with another exhaust manifold sub-assembly corresponding to an adjacent battery cell module and the exhaust manifold is one of directly bolted to and snapped onto the at least one of the plurality of battery cells.

10. The motor vehicle of claim 9, wherein the plurality of battery cells is organized into a battery cell module, and wherein the plurality of battery cells includes a first row of battery cells and an adjacent second row of battery cells.

11. The motor vehicle of claim 9, wherein the battery system is a battery cell pack.

12. The motor vehicle of claim 9, wherein the battery system additionally includes a temperature-sensitive component arranged inside the battery system enclosure between the plurality of battery cells and the enclosure cover, and wherein the exhaust outlet is configured to discharge the high-temperature gases distally from the temperature-sensitive component.

13. The motor vehicle of claim 9, wherein the exhaust outlet is arranged either inside the battery system enclosure or in the external environment.

14. The motor vehicle of claim 9, wherein each of the plurality of battery cells is a prismatic cell having a respective cell vent oriented toward the enclosure cover, and wherein the exhaust manifold interfaces with each prismatic cell at the respective cell vent.

15. The motor vehicle of claim 14, wherein the exhaust manifold includes gas channels defining the individual gas paths, and wherein the gas channels are fluidly sealed to each of the plurality of battery cells at the corresponding cell vents.

16. The motor vehicle of claim 9, wherein the exhaust manifold is constructed from a high-temperature fiber-reinforced thermoplastic.

17. A battery system comprising:

a plurality of battery cells organized into individual battery modules, each cell having respective cell vents;

a battery system enclosure surrounded by an external environment, configured to house the plurality of battery cells, and including an enclosure tray configured to house the plurality of battery cells and an enclosure cover configured to engage the enclosure tray and seal the battery system enclosure; and an exhaust manifold arranged between the plurality of battery cells and the enclosure cover and having multiple individual gas paths in fluid communication with an exhaust outlet and configured to collect high-temperature gases from each of the plurality of battery cells at the respective cell vents and guide the high-temperature gases from each of the plurality of battery cells to the exhaust outlet;

wherein:

the exhaust outlet is arranged in the external environment to discharge the high-temperature gases distally from the plurality of battery cells;

the exhaust manifold has a modular construction including exhaust manifold sub-assemblies;

each battery cell module includes a respective exhaust manifold sub-assembly configured to interface directly with another exhaust manifold sub-assembly corresponding to an adjacent battery cell module and the exhaust manifold is one of directly bolted to and snapped onto the at least one of the plurality of battery cells.

* * * * *